DATA RATE CONVERTER

Filed Sept. 14, 1967 2 Sheets-Sheet 1

INVENTORS B. R. SALTZBERG
J. E. SAVAGE
BY J. P. Kearns
ATTORNEY

Dec. 15, 1970 B. R. SALTZBERG ET AL 3,548,309

DATA RATE CONVERTER

Filed Sept. 14, 1967 2 Sheets-Sheet 2

United States Patent Office
3,548,309
Patented Dec. 15, 1970

3,548,309
DATA RATE CONVERTER

Burton R. Saltzberg, Middletown, N.J., and John E. Savage, Providence, R.I., assignors to Bell Telephone Laboratories, Incorporated, Murray Hill and Berkeley Heights, N.J., a corporation of New York
Filed Sept. 14, 1967, Ser. No. 667,768
Int. Cl. H04b *1/00, 1/66;* H04j *3/16*
U.S. Cl. 325—38 5 Claims

ABSTRACT OF THE DISCLOSURE

A digital data transmission system designed to operate at one synchronous rate is adapted to transmit data at another synchronous rate without altering the transmission facility, provided the ratio between the message and system rates is a proper rational fraction. Applique circuits at transmitter and receiver respectively generate and recover timing signals for the two rates from common synchronized sources.

FIELD OF THE INVENTION

This invention relates to synchronous digital data transmission systems and particularly to data rate converters for such systems.

BACKGROUND OF THE INVENTION

It is generally agreed that the most efficient operation of bandlimited transmission facilities is attained by synchronous operation. In synchronous operation each bit of information is generated in time slots of identical duration at a constant rate. Timing is simplified and signal sampling at optimum times is more easily achieved.

Unfortunately, the synchronous rate that is ideal for a given transmission facility is not necessarily ideal for all, or even many, signal sources. If an ideal synchronous rate for a transmission facility is chosen as a standard, this same synchronous rate must necessarily be a compromise with respect to any given signal source supplying information to such facility. Complex buffering arrangements become necessary when the data source cannot be made to operate at the facility rate.

It is an object of this invention to make it possible to mate signal sources operating at their ideal transmission rates to transmission facilities operating at their ideal transmission rates without altering either one of them.

It is another object of this invention to enable the coupling of transmission facilities and transmission sources without specifically modifying the natural synchronous transmission rates of either.

It is a further object of this invention to provide simple devices for matching a synchronous source to a synchronous channel when the former operates at a rational fraction of the rate of the latter.

SUMMARY OF THE INVENTION

According to this invention, there is provided for the transmitting end of a synchronous digital data transmission facility a master timing source whose frequency is harmonically related to both the synchronous facility rate and the data source rate. There is further provided at the receiving end of the transmission facility an oscillator operating at the frequency of the master timing source and phase-locked to a timing clock source at the facility transmission rate. The phase-locked oscillator output is frequency divided down to the data source rate and phase controlled relative to the transitions in the received message wave to achieve optimum sampling.

The timing clock source may be that already available as part of the transmission facility.

The message data are sampled according to this invention at the facility rate and these samples are sent over the transmission facility at its synchronous rate. Since the data source rate is slower than the facility rate, some data bits will be sampled more than once. Such duplicate samples must be suppressed at the receiver. Proper phasing of the sampling times at the receiver will, however, effectively skip these repeated transmitted samples.

Depending on the ratio between the source and facility rates, the number of duplicate samples of a source data bit obtainable at the facility rate can be predetermined. These duplicate samples are detected at the receiver with the aid of a transition detector for the sequence of received facility pulses. The detected transitions are applied to a counter which is periodically reset by the receiver sampling signal. The counter is arranged to reach a threshold and produce an error control output when the above-mentioned number of duplicate samples is registered. The error control output serves to shift the phase of the receiver sampling signal by an incremental amount. Eventually, based on one or more of such error control signals, the phase of the receiver sampling signal is optimized so that duplicate samples of the source data are skipped and the source data are properly reproduced. When the receiver sampling times are optimized, the counter never reaches its threshold between resetting impulses. Should synchronism be lost due to noise or other disturbance in the transmission facility, it will be rapidly and automatically restored in the same fashion.

It is a feature of this invention that the synchronous data rate converter can be readily adapted to accommodate a number of source rates.

DESCRIPTION OF THE DRAWING

The above and other objects, features and advantages of this invention will be better appreciated by a consideration of the following detailed description and the drawing in which.

DETAILED DESCRIPTION

Figure 1:
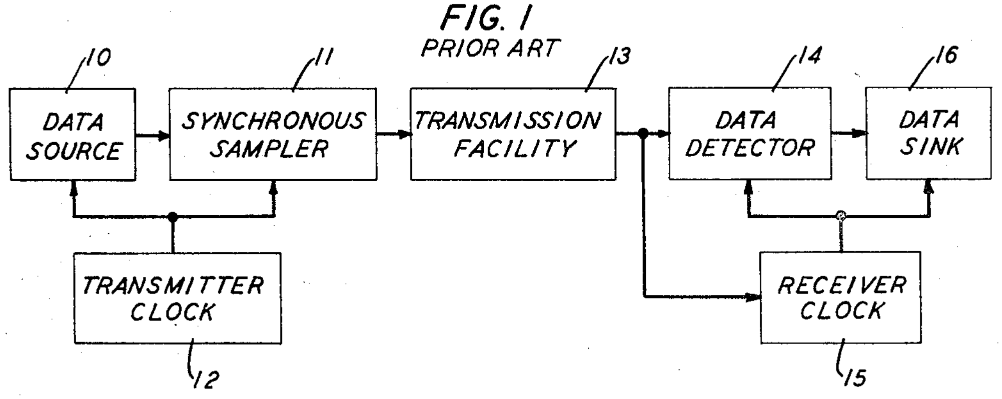
FIG. 1 PRIOR ART
FIG. 1 is a block diagram of a representative synchronous data transmission system of the prior art.

FIG. 1 illustrates the conventional synchronous digital data transmission system of the prior art which comprises digital data source 10, sampling circuit 11, transmitter clock circuit 12, transmission facility 13, data detector 14, receiver clock 15 and data sink 16. Source 10, sampler 11 and clock 12, together with part of facility 13, constitute a data communications transmitter. Detector 14, clock 15 and data sink 16, together with another part of facility 13, constitute a data communications receiver. A remaining part of facility 13 constitutes a transmission link between transmitter and receiver and may be a wire line, a cable or a channel of a multiplex system, itself including possible radio links. Depending on the bandwidth of facility 13 and other factors, such as noise, an ideal synchronous transmission rate is established for facility 13. Transmitter clock 12 and receiver clock 15 then provide timing and sampling pulses for this chosen transmission rate.

Elements 11 through 14 are generally furnished by a communications utility, while source 10 and sink 16 are provided by a data communications customer.

Transmitter clock 12 provides synchronous timing signals to both source 10 and sampler 11 for baseband signals. Whether or not modulation and demodulation is performed by facility 13 is determined by the transmission characteristics of facility 13. Receiver clock 15 is synchronized with transmitter clock 12 by any one of several known methods, such as by means of data signal transitions in the received wave. Once established the transmission rate is not readily changed.

Receiver clock 15 supplies timing signals to data detector 14 and data sink 16 at the same synchronous rate.

Figure 2:
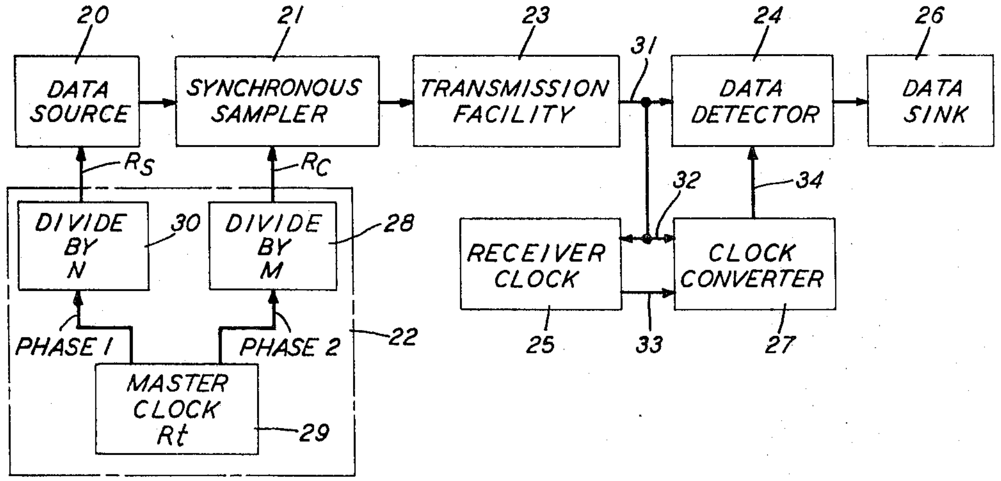
FIG. 2 is a block diagram of a synchronous data transmission system modified according to this invention to handle digital data at a synchronous rate different from the system rate without altering the basic transmission system.

FIG. 2 illustrates the same basic synchronous digital data transmission system as does FIG. 1. This transmission system comprises data source 20 and synchronous sampler 21 at the transmitting end of transmission facility 23; and at the receiving end of transmission facility 23, data detector 24 and data sink 26. These elements are substantially the same as the corresponding elements of FIG. 1. Transmission facility 23 has an established transmission rate $R_c$. It is desired to modify the system so that source 20 and sink 26 operate at some lesser synchronous rate $R_s$, independently, or at least substantially independently, of facility synchronous rate $R_c$. Thus, the communications customer is to have some control over his source and sink rates and still continue to use the utility provided communications network.

This desirable modification is made feasible according to this invention, provided that the ratio of the two synchronous transmission rates $R_s/R_c$ is a proper rational fraction $M/N$, i.e., M and N are integers (preferably small integers less than ten), and M is less than N. The modification necessary comprises at the transmitter end of facility 23 a new transmitter clock circuit 22 and at the receiver end, a receiver clock converter circuit 27.

New transmitter clock 22 provides separate clock outputs at the synchronous rates $R_c$ and $R_s$. Clock 22 advantageously comprises master clock 29, whose frequency is the least common multiple $R_t$ of transmission rates $R_s$ and $R_c$, and a pair of frequency-dividing circuits 28 and 30, whose respective divisors are M and N. Master clock 29 is further provided with two outputs in opposite phase designated phase 1 and phase 2 in FIG. 2 to avoid taking data samples on data transitions.

For purposes of explanation a concrete example is assumed. Let the ratio $R_s/R_c=M/N=3/5$. For a telephone channel the synchronous facility rate may typically be $R_c=1200$ Hz. The conclusion follows that source rate $R_s=720$ Hz. and master clock rate $R_t=3600$ Hz.

Figure 4:
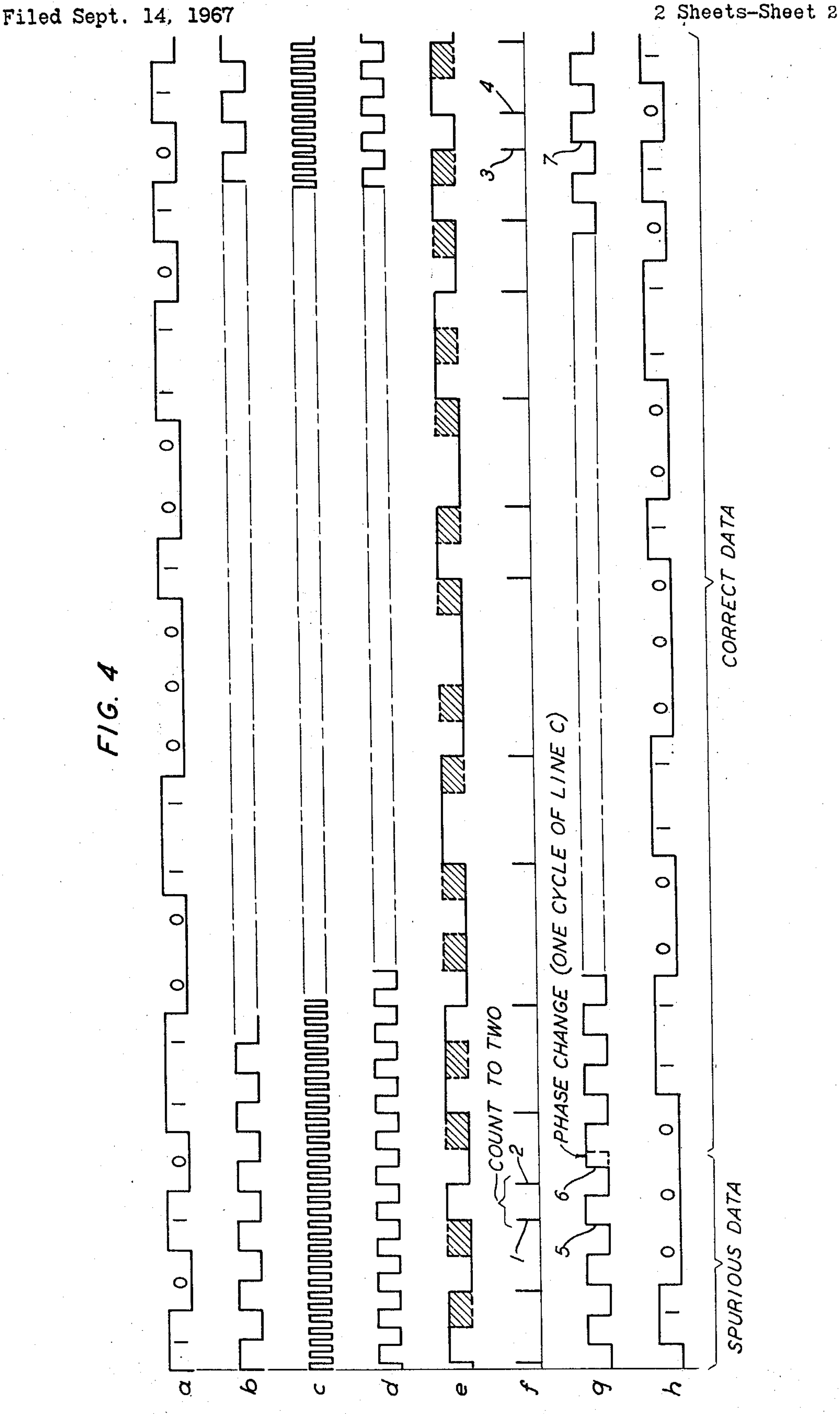
FIG. 4 is a waveform diagram explanatory of typical operating conditions of the arrangement of FIGS. 2 and 3.

In the waveform diagram of FIG. 4 in accordance with these assumptions, line (*a*) shows a representative message data signal from source 20 of FIG. 2 at the source synchronous rate $R_s$ shown on line (*b*). Line (*c*) of FIG. 4 in turn represents the rate $R_t$ of master clock 29. The source timing wave of line (*b*) is derived from the clock wave of line (*c*) in divider 30 with divisor $N=5$ based on positive transitions (phase 1) of the master clock wave. Line (*d*) of FIG. 4 is the sampling wave at facility synchronous rate $R_c$ derived from the master clock wave of line (*c*) in divider 28 with divisor $M=3$ based on negative transitions (phase 2) of the master clock wave. The positive transitions of the timing wave on line (*d*) sample the data on line (*a*) and produce the facility signal shown on line (*e*) of FIG. 4. Duplicate samples of the message wave of line (*a*) are represented on line (*e*) by the shaded areas. If these duplicate samples are in some way suppressed, the original message wave of line (*a*) can be recovered and source 20 will have been matched to facility 23.

It is apparent that in the alternative new transmitter clock 22 can be also implemented by making use of the existing transmitter clock 12 of FIG. 1. Let the output of transmitter clock 12 supply the basic timing wave at facility frequency $R_c$ to the synchronous sampler as in FIG. 1. Then derive source frequency $R_s$ from clock 12 by taking the Mth harmonic of $R_c$ and dividing this Mth harmonic by N, being careful to use negative transitions in the harmonic wave to operate the frequency divider.

Clock converter circuit 27 of FIG. 2 performs the function of regenerating a sampling wave at source (or sink) synchronous rate $R_s$ for the purpose of recovering the original data message from the facility signal shown on line (*e*) of FIG. 4. This sampling wave at rate $R_s$ is jointly derived from the output of receiver clock 25 at facility rate $R_c$ over lead 33 and from zero-crossing transitions in the message wave over lead 32. Clock 25 is the same as clock 15 in FIG. 1.

Figure 3:
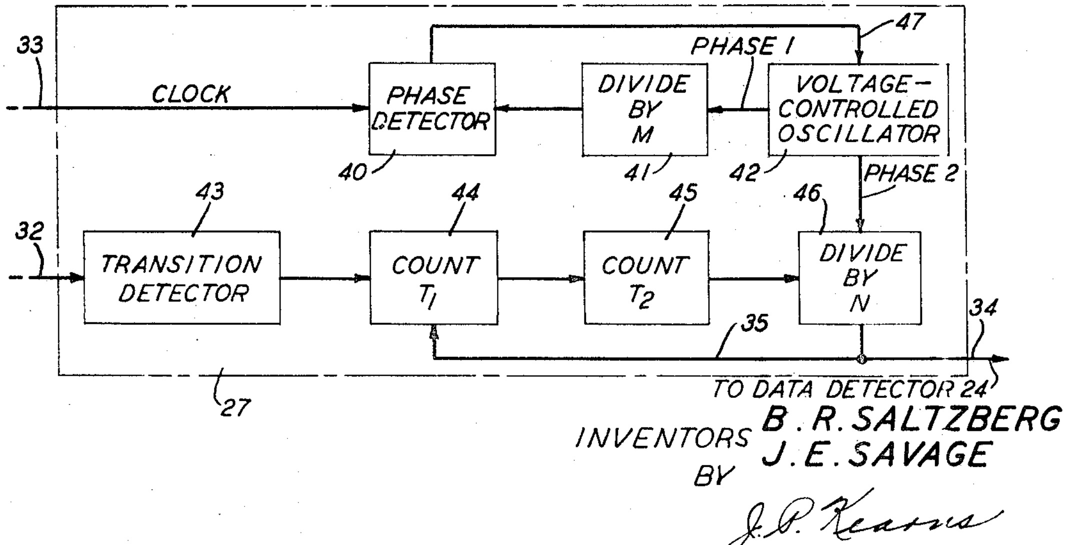
FIG. 3 is a block diagram of a synchronous receiver data rate converter according to this invention.

An embodiment of the rate conversion arrangement according to this invention is shown in detail in FIG. 3. The problem is to place the receiver sampling wave in the correct phase to avoid sampling the shaded areas in the facility wave of line (*e*) of FIG. 4. The rate converter of FIG. 4 comprises voltage-controlled oscillator 42 at nominal frequency $R_t$, frequency divider 41 with divisor M driven by phase 1 of the output of oscillator 42, phase detector 40 synchronized with receiver clock 25 over lead 33, frequency divider 46 with divisor N and driven by phase 2 of the output of oscillator 42, transition detector 43 responsive to the facility signal on lead 32, and counter circuits 44 and 45 with respective count thresholds $T_1$ and $T_2$.

Voltage-controlled oscillator 42 is synchronized with the frequency $R_c$ of receiver clock 25 by having its phase 1 output at frequency $R_t$ divided by M in divider 41 to produce frequency $R_c$. A comparison of the phases of clock frequency $R_c$ with the output of divider 41 in phase detector 40 produces an error signal proportional to the difference in phase of the two inputs to phase detector 40. This error signal on lead 47 pulls oscillator 42 into phase with clock 25. Clock 25 in turn is synchronized with transitions in the facility wave in the usual way. The phase 2 output of oscillator 42 at frequency $R_t$ is separately frequency divided in divider 46 by divisor N to produce the sampling frequency $R_s$ on leads 34 and 35.

Transition detector 43 operates on the received facility wave and produces a train of pulses from all transitions whether positive or negative as shown on line (*f*) of FIG. 4. Line (*g*) of FIG. 4 shows the output of divider 46 of FIG. 3 as it appears on leads 34 and 35. Its initial phase is arbitrary. Its positive transitions sample the received wave on line (*e*). Line (*h*) of FIG. 4 shows the results of this sampling. The first positive transition is correctly timed with respect to unshaded portions of the received wave. However, positive transition 5 of line (*g*) occurs during a shaded portion of the received wave and as a result the correct message squence 1010 is incorrectly reproduced as the sequence 1000.

This situation is corrected by counting transitions in the output of detector 43. With proper phasing and no facility-induced errors only one transition can occur between samples. Counter 44 counts these transitions and is reset by each sampling transition over lead 35. It will be observed on line (*f*) of FIG. 4 that transition pulses 1 and 2 occur within a sampling interval $1/R_s$). Two counts will accordingly be registered in counter 44 between sampling transitions 5 and 6 on line (*g*). Assuming that counter 44 has a threshold of two, it will produce an error output to be fed to counter 45. Ignoring counter 45 for the moment, let this error output provide an advance pulse to divider 46. Divider 46 will advance in phase by one cycle of frequency $R_t$ as shown at position 6 on line (*g*) of FIG. 4. The remaining positive transitions of the sampling wave of line (*g*) now avoid all the shaded portions of the received wave and correctly reproduce the original message wave.

Another pair of transitions in the received wave occur at positions 3 and 4 on line (*f*) of FIG. 4, which are closer together than the sampling interval. However, transitions 3 and 4 straddle sampling instant 7 and counter 44 cannot reach its threshold.

For the particular initial phase of the receiver-regenerated sampling wave shown on line (*g*) of FIG. 4, only one phase change was required to bring the sampling wave into its correct phase relative to the shaded areas of the received wave of line (*e*). In general, however, more incremental phase changes will be required to a maximum of N, since the incremental change is $1/N$th of the frequency $R_t$ of oscillator 42. Then, too, correct phasing can only be reliably achieved if random data is being transmitted. This is no serious disadvantage, however, since some random starting sequence is usually required for each data message for one reason or another, such as, aligning echo suppressors occurring in many transmission links.

The threshold $T_1$ for counter 44 is related to the ratio $M/N$ of the source rate to the facility rate. It is correctly set at one more than the maximum number of samples that can be taken of any source pulse at the facility rate. Thus $$T_1=1+[N/M]$$

where the ratio $[N/M]$ is rounded to the nearest whole number less than or equal to $N/M$. For the ratio 5/3 such whole number is one. Therefore, in the assumed example $T_1=2$.

Facility errors can introduce spurious transitions between sample at rate $R_c$ and cause the receiver to change phase incorrectly. To remedy this possibility counter 45 is included in FIG. 3 in series between the output of counter 44 and divider 46. Its threshold is determined on the basis of the probability of the occurrence of such facility errors. It has been found that for an average telephone grade facility, the probability of such errors is less than one in ten thousand samples at rate $R_c$ and a threshold of $T_2=4$ is appropriate for a source to facility ratio of 3/5. Provision may be made to reset counter 45 periodically.

While the arrangement according to this invention for matching a synchronous source to a synchronous facility when the former operates at a rational fractional of the latter has been disclosed in terms of a specific illustrative embodiment, it will be apparent to one skilled in the art that many modifications are possible within the spirit and scope of the disclosed principle.

What is claimed is:

1. In combination with a synchronous data transmission system having the transmission rate $R_c$ and at opposite terminals of such system a respective digital data source and data sink, said data source and data sink having the common data rate $R_s$, $R_s$ being less than $R_c$ and the ratio $R_s/R_c$ being a ratio of whole numbers, means at said transmitting terminal for sampling source data at said transmission rate $R_c$ to form a line signal, clock converter means at said receiving terminal having as the nominal frequency a common multiple $R_t$ of said rates $R_c$ and $R_s$, and means at said receiving terminal jointly controlled by said clock converter means and by zero-crossing transitions in said line signal for regenerating a sampling wave at said source rate $R_s$ in proper phase to recover source data from said line signal for delivery to said sink.

2. In combination with a synchronous data transmission system having the transmission rate $R_c$ and a digital data source having the source rate $R_s$, the ratio $R_s/R_c$ being a proper rational fraction:

means at the transmitting end of said system converting data from said source at said rate $R_s$ to a line signal at said rate $R_c$ comprising a transmitting clock source operating at the rate $R_t$ equal to the least common multiple of said rates $R_s$ and $R_c$, first frequency dividing means deriving from opposite phases of the output of said transmitting clock timing signals at said rates $R_s$ and $R_c$, means responsive to said timing signal at the rate $R_s$ releasing data from said source, and means responsive to said timing signal at the rate $R_c$ sampling data from said source to form a line signal; and means at the receiving end of said system recovering data from said line signal at said rate $R_s$ comprising a receiving clock source operating at said rate $R_c$, a voltage-controlled oscillator responsive to said receiving clock regenerating a timing signal at said rate $R_t$, second frequency-dividing means responsive to the timing signal from said oscillator at said rate $R_t$ deriving a sampling signal at said rate $R_s$, means responsive to said line signal detecting transitions therein, counter means having a threshold count equal to one more than the whole number in the ratio $R_c/R_s$ connected to said transition-detecting means, the output of said counter at threshold being an error control signal, means responsive to said error control signal changing the phase of the output of said second dividing means by one cycle of the timing signal at said rate $R_t$, and means sampling said line signal with the sampling signal from said second dividing means to restore said source data.

3. The combination defined in claim 2 in which further counter means is located in series between said counter means and said phase-changing means, said further counter means also having a predetermined threshold count preventing the generation of an error control signal from random noise transitions.

4. In combination with a synchronous data transmission system having the transmission rate $R_c$ and a digital data source at the transmiting terminal of such system having the data rate $R_s$ less than transmission rate $R_c$, the ratio $R_s/R_c$ being a proper rational fraction:

timing means having complementary outputs at the frequency $R_t$, the least common multiple of said data rate $R_s$ and said transmission rate $R_c$, first frequency-dividing means connected to one of said complementary outputs having the division ratio $R_t/R_s$ for generating a timing signal, said data source being responsive to said timing signal for releasing data at said rate $R_s$, second frequency-dividing means connected to the other of said complementary outputs having the division ratio $R_t/R_c$ for generating a sampling signal at said rate $R_c$, sampling means jointly responsive to said digital data source and said sampling signal for producing a line signal having zero-crossing transitions compatible with said rate $R_c$ and means connecting said sampling means to said transmission system for delivering said line signal to said system.

5. In combination with a synchronous data transmission system having the fixed transmission rate $R_c$ and a digital data sink at the receiving terminal of such system having the data rate $R_s$ less than transmission rate $R_c$, the ratio $R_s/R_c$ being a rational fraction: a data rate converter for said system over which are received line signals having zero-crossing transitions compatible with said transmission rate $R_c$ but encoding digital data at said data rate $R_s$ comprising a voltage-controlled oscillator having complementary outputs at the frequency $R_t$, the least common multiple of said data rate $R_s$ and said transmission rate $R_c$, first frequency-dividing means connected to one complementary output of said oscillator and having the division ratio $R_t/R_c$ generating a timing signal at the transmission rate $R_c$, a clock source having an output at the frequency $R_c$, phase-detector means controlling the phase of said oscillator having as inputs the timing signal from said first dividing means and said clock source, the output of said phase detector being proportional to the difference in phase between signals on its inputs, second frequency-dividing means connected to the other complementary output of said oscillator and having the division ratio $R_t/R_s$ generating a sampling signal at the data rate $R_s$, transition detector means for line signals from said transmission system, first counter means responsive to said transition detector means and resettable by said sampling signal producing an output when a predetermined threshold count equal to one more than the whole number part of the ratio $R_c/R_s$ is reached, second counter means responsive to the output of said first counter means and having an arbitrary threshold count producing an error output when said threshold count is reached, and means applying the error output of said second counter means to said second frequency-dividing means to change the phase of said sampling signal by one cycle of the frequency $R_t$ and thereby enable substantially error-free delivery of data to said data sink at said data rate $R_s$.

References Cited

UNITED STATES PATENTS

| | | | |
|---|---|---|---|
| 3,102,238 | 8/1963 | Bosen | 325—30 |
| 3,205,441 | 9/1965 | Likel | 178—66 |
| 3,441,674 | 4/1969 | Giordano et al. | 178—50 |

ROBERT L. GRIFFIN, Primary Examiner

A. J. MAYER, Assistant Examiner

U.S. Cl. X.R.

179—15